United States Patent [19]
Bondarev et al.

[11] 3,811,852
[45] May 21, 1974

[54] METHOD OF PRODUCING ROLLED POROUS GLASSCERAMIC MATERIAL

[76] Inventors: Konstantin Timofeevich Bondarev, Nizhnaya Pervomaiskaya ulitsa, 33 kv. 176; Nikolai Mikheevich Pavlushkin, ulitsa Gotvalda, 14, kv. 44; Isai Davidovich Tykachinsky, ulitsa Fadeeva, 6, kv. 140, all of Moscow; Viktor Stepanovich Kozlovsky, ulitsa Teatralnaya, 6a, kv. 22, Dolgoprudny Moskovskoi oblasti; Valentin Feoktistovich Krylov, ulitsa Kropotkina, 24/I, kv. 14; Svetlana Ivanovna Rud, ulitsa Pavla Korchagina, 10, kv. 6, both of Moscow, all of U.S.S.R.

[22] Filed: Aug. 22, 1972

[21] Appl. No.: 282,841

[52] U.S. Cl. .............................. 65/22, 65/33, 65/20
[51] Int. Cl. ............................................. C03b 19/08
[58] Field of Search ............................ 65/33, 20, 22

[56] References Cited
UNITED STATES PATENTS

| | | | |
|---|---|---|---|
| 3,150,988 | 9/1964 | Dess et al. .......................... | 65/20 X |
| 3,266,912 | 8/1966 | Murphy .............................. | 65/33 X |
| 3,677,728 | 7/1972 | Kitaigorodsky ..................... | 65/33 |
| 3,361,550 | 1/1968 | Murphy et al. ..................... | 65/22 |
| 3,288,584 | 11/1966 | Long ................................... | 65/22 |
| 3,313,644 | 4/1967 | Morrissey .......................... | 65/33 X |
| 3,464,807 | 9/1969 | Pressau ............................. | 65/33 |

FOREIGN PATENTS OR APPLICATIONS

| 4,518,989 | 6/1970 | Japan ................................. | 65/33 |

Primary Examiner—Frank W. Miga
Attorney, Agent, or Firm—Eric H. Waters

[57] ABSTRACT

A method of founding glass melt accompanied by its simultaneous frothing at a temperature of from 1,500° to 1,530°C, preparing the glass melt at a viscosity of from 25 to 60 poises and crystallizing the molded glass ribbon in a two-step process at respective temperatures of 650°–700°C and 1,100°–1,150°C and respective crystallization times of 0.3–0.5 hr and 1.0–1.5 hr, with the temperature rising between the two steps of the process with a 1.3°C/min gradient.

1 Claim, 3 Drawing Figures

METHOD OF PRODUCING ROLLED POROUS GLASSCERAMIC MATERIAL

The present invention relates to the glass industry and may be employed for producing strong porous white or through-stained glass-ceramic building materials for industrial and agricultural construction as well as civil engineering applications.

At present a variety of methods of producing porous materials on the basis of glass are known in the art.

Thus, for example, a known method of producing porous glass-ceramic materials consists in that molten slags, mostly metallurgical, are mixed with sand and other additives. The resultant mixture is charged into a glass furnace for founding, clarification and homogenization. The prepared glass melt is molded into a glass ribbon having a thickness of 3 to 5 mm, whereupon the ribbon obtained is cooled down and broken into small pieces which are then ground to yield glass powder with a particle size of up to 1.0 mm. The glass powder is poured into molds which are placed in a crystallizer-frother for heat treatment.

In the process of heat treatment the glass powder is heated to the melting point and is then crystallized at temperature of from 900° to 1,100°C depending on the chemical composition of the glass. Prior to crystallization, the glass froths due to the liberation of dissolved gases (see, for example, USSR Inventor's Certificate No. 166470, Cl.C03B, 19/08).

The disadvantages of the known method are its multi-step and multi-cycle nature as well as the need for sophisticated equipment. Besides, this method does not allow for continuous porous glass-ceramic production in the form of a ribbon.

It is an object of the present invention to obviate the above-mentioned disadvantages.

According to the invention there is provided a method of producing rolled porous glass-ceramic material characterized by such operations and parameters as permit simplifying the process as a whole, substantially raising its efficiency at a minimized consumption of raw material, and producing porous glass-ceramic material in the form of a continuous ribbon calling for no additional operations involved in the processing and manufacture of individual items.

Accordingly there is provided a method of producing rolled porous glass-ceramic material by glass melt founding and preparation followed by subsequent forming thereof into a ribbon and crystallization of the latter, whereby according to the invention the glass melt founding process is accompanied by simultaneous glass melt frothing at a temperature of from 1,500° to 1,530°C, the frothed glass melt being prepared at a viscosity of from 25 to 60 poises, and the ribbon molded therefrom is subjected to two-step crystallization at respective temperatures 650°-700°C and 1,100°-1,150°C and respective crystallization times of 0.3-0.5 hr and 1.0-1.5 hr, with the temperature rising between the two steps of the process in increments of 1-3°C per min.

If it is required to produce through-stained porous glass-ceramic material, heavy metal oxides can be used to stain the glass melt.

If it is required to produce surface-stained porous glass-ceramic material, silicate dyes are applied onto the surface of the molded glass ribbon.

Crystallization of a porous glass-ceramic ribbon by heat treatment may be effected in various ways of which the best one is to crystallize the glass ribbon on a gas-air blanket or on the surface of molten metal.

Essentially, the proposed method consists in the following.

Owing to the fact that glass melt founding is accompanied by its simultaneous frothing at a temperature of 1,500°-1,530°C, frothing results from the combustion of fuel directly in the glass melt, as distinct from the known method whereby the frothing of glass in a powdered state is achieved in the course of heat treatment. The effect of glass melt frothing leads to a high rate of closed pore formation, allows dispensing with the laborious and expensive operation of glass grinding, as well as reducing the amount of time and heat requisite for powder formation and obtaining a stronger and lighter material. Moreover, the concurrence of founding and frothing operations allows for the saving on time and heat requirements for the process of pore formation and, in the final analysis, raising the efficiency of production.

The 25-60 poise viscosity provides for the required level of saturation of the glass melt with gas and for the rate of closed pore formation above 50 per cent.

Due to two-step crystallization at temperatures of 650°-700°C and 1,100°-1,150°C respectively and at respective crystallization times of 0.3-0.5 and 1.0-1.5 hr, the frothed glass melt is crystallized through the entire volume with resultant improvement in the strength of the material.

Since the operation of glass melt founding is combined with its simultaneous frothing, a porous glass ribbon is obtained directly from the melt, which ribbon, subjected to said heat treatment, gives a high-strength porous material in the form of a continuous ribbon.

Embodiments of the present invention will now be described, by way of example, with reference to the accompanying drawings, wherein.

It is recommended that the composition of glass used as feedstock for the production of rolled porous glass-ceramic should be within the system: CaO - MgO - $Al_2O_3$ - $SiO_2$.

For continuous founding and simultaneous frothing of the glass melt use can be made of direct-flow converter furnaces or cyclone glass-melting chambers which favorably differ from other glass furnaces by a high intensity of fuel combustion, a high pyrometric effect and the possibility of obtaining in one cycle a quality porous glass melt. With the employment of waste heat for crystallization, such furnaces give a heat-utilization factor in the vicinity of 80 per cent.

The glass melt is founded from bulk or granulated charge at a temperature of 1,500°-1,530°C or from molten slags with additives. It is desirable to employ such glass compositions as would lend themselves to crystallization without special catalysts.

In the course of founding, due to the combustion of fuel in the glass melt, minute closed pores are formed in the melt.

Acid melts are saturated with bubbling gases and while cooling down acquire a porous structure.

Figure 1:
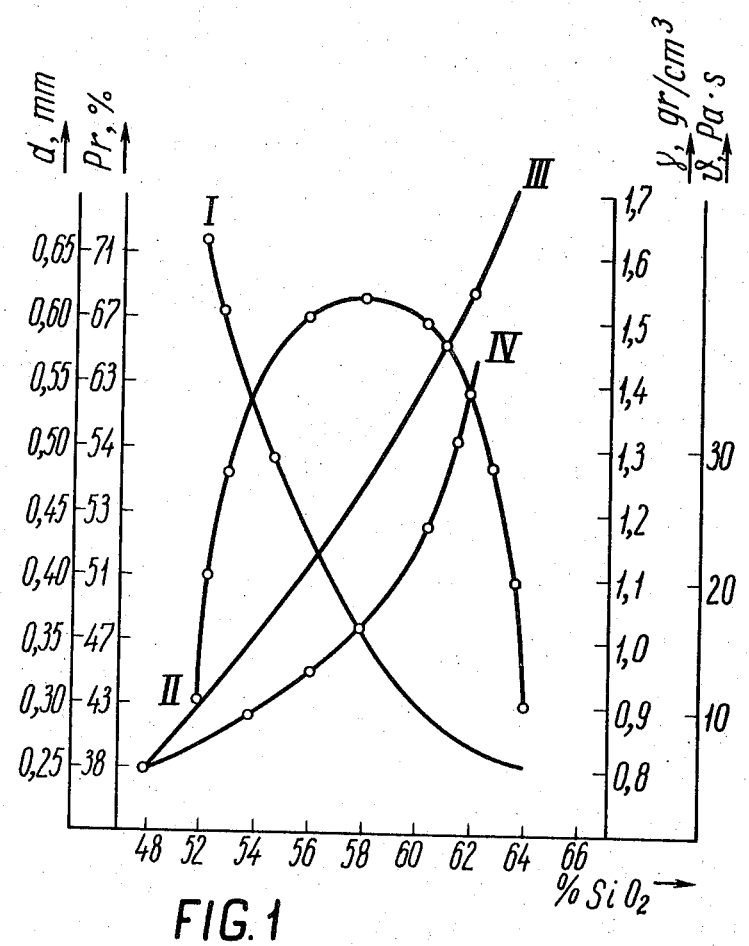
FIG. 1 is a graph of volumetric weight, gas bubble size, porosity and viscosity of the glass melt versus the $SiO_2$ level in the melt at the preparation temperature.

The extent and character of frothing depend on the viscosity of the melt which is determined by the optimum content of $SiO_2$, as is seen from the graph of FIG. 1, wherein:

I is a curve of volumetric weight variation,
II is a curve of bubble diameter variation,
III is a curve of material volumetric weight variation,
IV is a curve of viscosity variation.

The process of production of rolled porous glass-ceramic material proceeds on a continuous line comprising a converter 1 (FIGS. 2 and 3), wherein the glass melt is founded and frothed, a glass melt accumulator 2 heated by a gas burner 3, a rolling machine 4, a crystallizer 5, a polishing conveyer 6 and an automatic cutter 7 of a glass ribbon 8.

The porous glass melt is fed from the accumulator 2 to the rolling machine 4 at a temperature of from 1,380° to 1,430°C.

The glass melt is maintained at a $SiO_2$ level of 55–70 per cent by weight, which, at the preparation temperature, provides for the optimum 25–60 poise viscosity (2.5–6.0 nsec/m) conducive to a rate of closed pore formation in the glass melt of up to 50 per cent, with the pore size being within 0.30–0.80 mm corresponding to a material with a volumetric weight of between 1.1 and 1.4 g/cm$^3$.

The molded ribbon is crystallized in the crystallizer 5 having a metal roll table 9 in the temperature zone of up to 700°C, and a gas blanket 10 (FIG. 2) or a bath 11 containing molten metal (FIG. 3) in the temperature zone of between 700°C and 1,150°C.

The belt is crystallized in a two-step process at respective temperatures of 650°–700°C and 1,100°–1,150°C and respective crystallization times of 0.3–0.5 and 1–1.5 hr, with the temperature raised between the stages in increments of from 1° to 3°C per min.

The glass-ceramic material obtained contains mostly a crystalline phase in the form of minutest wollastonite crystals and a residual glass phase.

The material obtained can be stained in one or many colors with ceramic dyes applied onto the surface of the molded ribbon, or else the founded glass melt, prior to being molded into a ribbon, is stained with heavy metal oxides ($Fe_2O_3$, CoO, $MnO_2$, $Cr_2O_3$, etc.).

The material of this invention may be produced from the following raw materials: synthetic materials (in the form of oxides), sand, dolomite, clay, molten and waste metallurgical slags and a variety of rock.

EXAMPLE 1

The charge was prepared from a natural raw material: sand, chalk, dolomite, clay and broken glass. The glass melt was founded in a converter chamber 1 (FIG. 2) in air blast at a temperature of 1,500°–1,520°C. In the process of founding the glass melt was frothed with gas liberated through fuel combustion in the melt.

The content of $SiO_2$ was maintained at a level compatible with a viscosity within 40–50 poise.

The glass was prepared in the accumulator 2 at a temperature of 1,380°–1,400°C. The glass ribbon was formed in the rolling machine 4 having small and large rollers. The glass ribbon molded in the machine was 3,000 mm wide, 20 mm thick and abounded in minutest closed pores.

The porous glass ribbon was temperatures in the crystallizer on the roll table 9 at temperature of 650° and 1,100°C and at respective crystallization times of 30 min and 1 hr, and on the gas blanket 10 at a temperature of 1,100°C and crystallization time of 1 hr. In both cases the temperature was raised between the two steps of the process with a 2°C/min gradient.

After cooling down, the porous glass-ceramic ribbon 8 was diamond-sawed into sheets.

EXAMPLE 2

Porous glass-ceramic material was obtained in a manner similar to that described in Example 1. In order that the material may be blue-stained, a powdered $Cr_2O_3$ dye was introduced into the glass melt.

EXAMPLE 3

Porous glass-ceramic material was obtained in a manner similar to that described in Example 1. In order to obtain a surface-stained material, various silicate dyes containing a $TiO_2$ pigment were in one case applied onto the entire surface of the ribbon, while in an other case they were applied by spraying onto part of the ribbon surface.

EXAMPLE 4

Figure 2:
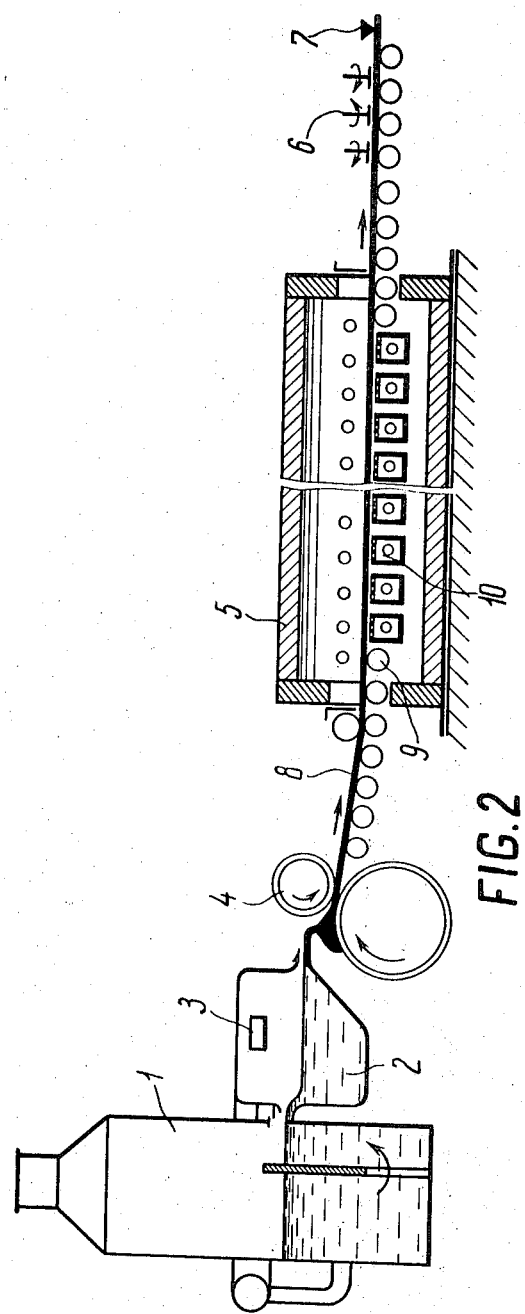
FIG. 2 is a flowsheet of rolled glass-ceramic production with the glass ribbon crystallized on a gas-air blanket.
Figure 3:
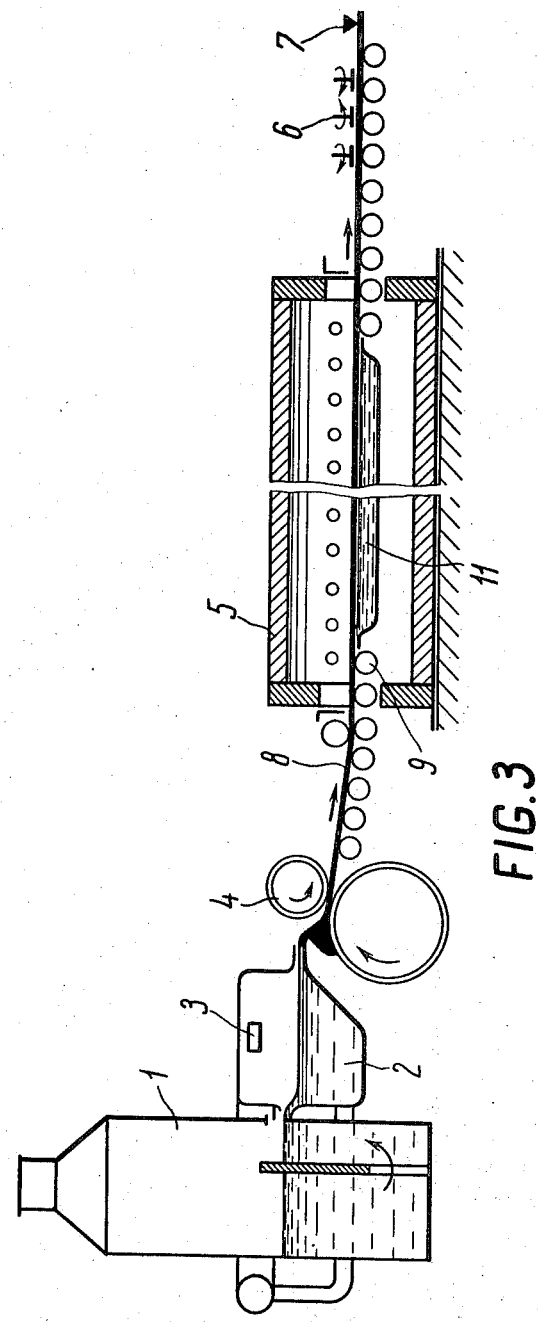
FIG. 3 is a flowsheet of rolled glass-ceramic production with the glass ribbon crystallized on a molten metal surface.

The charge was composed of blast-furnace slag, quartz sand and broken glass. Simultaneous glass founding and frothing was effected in the converter 1 (FIGS. 2 and 3). Founding was carried out in an oxidizing medium with the result that sulfide sulfur was burned out allowing white glass-ceramic material to be obtained after heat treatment.

The material obtained according to the proposed method has the following properties:

| Property | Unit of measurement | Property characteristic |
| --- | --- | --- |
| Specific weight | g/cm$^3$ | 2.43 |
| Volumetric weight | g/cm$^3$ | 1.1–1.4 |
| True porosity | % | 27.1 |
| Open porosity | % | 8.6 |
| Closed porosity | % | 18.5 |
| Water absorption | % | 2.8 |
| Softening point | °C | 900 |
| Thermal expansion ratio | l/deg | 54.10$^{-7}$ |
| Bending strength | kg/cm$^2$ | 600–750 |
| Compressive strength | kg/cm$^2$ | 1,500–2,000 |
| Chemical resistance, losses in percent: | | |
| in water | | 0.07 |
| in alkali 1 n NaOH | | 2.33 |
| in acid 1 n HCl | | 0.11 |

The porous glass-ceramic material produced according to the proposed method looks like natural rock and may find wide application as lining and bearing material for inner and outer walls of buildings, for ceilings, fences, etc. Surface-stained with ceramic dyes or through-stained in one or many colors, this material may also be widely employed as decorative finish for buildings and structures of various purposes.

The proposed method of producing rolled porous glass-ceramic material makes it possible to obtain strong porous material in the form of a continuous ribbon on a continuous mechanized line.

What we claim is:

1. A method of producing porous glass-ceramic sheet material, comprising the steps of founding glass melt at a temperature of 1,500° to 1,530°C; foaming said glass melt with a gas obtained by the combustion of a fuel directly within the melt simultaneously with founding; preparing said foamed glass melt at a viscosity of 25 to 60 poises; molding said foamed glass melt into a ribbon and crystallizing the molded ribbon in a two-stage process, wherein said glass ribbon is held at a temperature of 650°–700°C for 0.3 to 0.5 hour at the first stage, and at a temperature of 1,100°–1,150°C for 1.0 to 1.5 hours at the second stage, the temperature rising at a rate of 1° to 3°C per minute between the two stages.

* * * * *